(12) United States Patent
Yang et al.

(10) Patent No.: US 10,895,874 B2
(45) Date of Patent: Jan. 19, 2021

(54) METHOD AND APPARATUS OF CONTROLLING A FLIGHT DEVICE

(71) Applicant: SZ DJI TECHNOLOGY CO., LTD., Shenzhen (CN)

(72) Inventors: Shuo Yang, Shenzhen (CN); Jiahang Ying, Shenzhen (CN); Zhaoliang Peng, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 310 days.

(21) Appl. No.: 15/986,461

(22) Filed: May 22, 2018

(65) Prior Publication Data

US 2018/0267525 A1 Sep. 20, 2018

Related U.S. Application Data

(63) Continuation of application No. PCT/CN2015/095308, filed on Nov. 23, 2015.

(51) Int. Cl.
*G05D 1/00* (2006.01)
*G08C 17/00* (2006.01)
*B64C 39/02* (2006.01)

(52) U.S. Cl.
CPC ......... *G05D 1/0011* (2013.01); *G05D 1/0022* (2013.01); *G08C 17/00* (2013.01); *B64C 39/024* (2013.01); *B64C 2201/146* (2013.01); *G08C 2201/93* (2013.01)

(58) Field of Classification Search
CPC ...... G05D 1/0011–005; G08C 2201/93; B64C 39/024; B64C 2201/141; B64C 2201/146
See application file for complete search history.

(56) References Cited

U.S. PATENT DOCUMENTS

| | | | |
|---|---|---|---|
| 7,902,866 B1* | 3/2011 | Patterson | G06F 30/34 326/41 |
| 2005/0090945 A1 | 4/2005 | Bodin et al. | |
| 2012/0022719 A1 | 1/2012 | Matos | |
| 2015/0120094 A1* | 4/2015 | Kimchi | G05D 1/00 701/3 |
| 2017/0102699 A1* | 4/2017 | Anderson | G06K 9/0063 |

FOREIGN PATENT DOCUMENTS

| | | | |
|---|---|---|---|
| CN | 101236434 A | | 8/2008 |
| CN | 103034185 A | | 4/2013 |
| CN | 103942940 A | | 7/2014 |
| CN | 104331085 A | | 2/2015 |
| CN | 204390045 U | | 6/2015 |
| CN | 104932533 A | | 9/2015 |
| CN | 104950906 | * | 9/2015 |
| CN | 104950906 A | | 9/2015 |
| CN | 104995575 A | | 10/2015 |

OTHER PUBLICATIONS

The World Intellectual Property Organization (WIPO) International Search Report for PCT/CN2015/095308 dated Aug. 8, 2016 Pages (including translation).

* cited by examiner

*Primary Examiner* — Spencer D Patton
(74) *Attorney, Agent, or Firm* — Anova Law Group, PLLC

(57) ABSTRACT

A method of controlling a flight device includes receiving, by a controller of the flight device, a control request from a target device for requesting a control of the flight device, receiving control data sent from the target device, and converting the control data into an executable instruction for controlling the flight device.

17 Claims, 5 Drawing Sheets

METHOD AND APPARATUS OF CONTROLLING A FLIGHT DEVICE

CROSS-REFERENCE TO RELATED APPLICATION

This application is a continuation of International Application No. PCT/CN2015/095308, filed on Nov. 23, 2015, the entire contents of which are incorporated herein by reference.

TECHNICAL FIELD

The present disclosure relates to flight control technology, and more particularly to a method and apparatus of controlling a flight device.

BACKGROUND OF THE DISCLOSURE

Unmanned aerial vehicles (UAVs), also known as drones, have been widely used in various fields including military and agriculture applications. For example, UAVs can be used to perform various tasks including aerial photography, highway survey, border patrol, forest fire protection and disaster assessment.

UAVs can be manually controlled by an operator using a remote manual control apparatus provided by a ground station. For example, a flight path of the UAV or an imaging operation of the UAV can be manually controlled. However, a flexibility in manipulating the UAV is limited by the remote manual control apparatus provided by the ground station.

SUMMARY OF THE DISCLOSURE

In view of the problems in the conventional technologies, the present disclosure provides a method and apparatus of controlling a flight device to improve a flexibility in controlling the flight device.

In order to attain the above objects, in one aspect, the disclosure provides a method of controlling a flight device comprising: receiving, by a controller of the flight device, a control request for requesting a control of the flight device from a target device; receiving control data sent from the target device; and converting the control data into an executable instruction for controlling the flight device.

In some embodiments, receiving, by the controller of the flight device, the control request from the target device can comprise receiving, by the controller of the flight device, the control request from a mobile terminal. Receiving the control data sent from the target device can comprise receiving the control data sent from the mobile terminal.

In some embodiments, receiving, by the controller of the flight device, the control request from the mobile terminal can comprise receiving, by the controller of the flight device, the control request sent from the mobile terminal via a wireless image transmission module, the mobile terminal being connected with the wireless image transmission module via a USB bus. Receiving the control data sent from the mobile terminal can comprise receiving the control data sent from the mobile terminal via the wireless image transmission module.

In some embodiments, before receiving the control request sent from the mobile terminal via the wireless image transmission module, the method further can comprise establishing, by the controller via the wireless image transmission module, a communication link between the controller and the mobile terminal. Receiving, by the controller of the flight device, the control request sent from the mobile terminal via the wireless image transmission module can comprise receiving, by the controller, the control request sent from the mobile terminal via the communication link. Receiving the control data sent from the mobile terminal via the wireless image transmission module can comprise receiving the control data sent from the mobile terminal via the communication link.

In some embodiments, receiving, by the controller of the flight device, the control request from the target device can comprise receiving, by the controller of the flight device, the control request sent from an onboard device of the flight device. Receiving the control data sent from the target device can comprise receiving the control data sent from the onboard device.

In some embodiments, receiving, by the controller of the flight device, the control request sent from the onboard device of the flight device can comprise receiving, by the controller of the flight device, the control request sent from the onboard device of the flight device via a serial interface, the onboard device being connected with the controller via the serial interface. Receiving the control data sent from the onboard device can comprise receiving the control data sent from the onboard device via the serial interface.

In some embodiments, the onboard device can be a processor or a sensor connected with the flight device via a universal interface of the flight device, the universal interface of the flight device being configured to connect various types of the onboard devices.

In some embodiments, converting the control data into the executable instruction for controlling the flight device can comprise converting the control data into a control instruction of a remote controller of the flight device.

In some embodiments, converting the control data into the control instruction of the remote controller of the flight device can comprise determining the control instruction corresponding to the control data based upon a preset mapping between the control data and the instruction of the remote controller.

In some embodiments, after receiving, by the controller, the control request, the method can further comprise directing the flight device into a virtual control mode in response to the control request. Receiving control data sent from the target device can comprise receiving the control data sent from the target device in the virtual control mode.

In some embodiments, directing the flight device into the virtual control mode in response to the control request can comprise calling and running, by the controller, a preset virtual control program in response to the control request to enter the flight device into the virtual control mode. Converting the control data into a control instruction of a remote controller can comprise executing the virtual control program upon receiving the control data via a preset interface to convert the control data into the control instruction of the remote controller, the preset interface being a callable interface provided by the virtual control program.

In some embodiments, before directing the flight device into the virtual control mode, the method can further comprise: detecting whether the flight device is currently in the virtual control mode; and directing the flight device into the virtual control mode if the flight device is currently not in the virtual control mode.

In some embodiments, after directing the flight device into the virtual control mode, the method can further comprise switching a control mode of the flight device to a remote control mode under which the flight device is controlled by the remote controller when a virtual control termination request is received from the target device.

In some embodiments, after directing the flight device into the virtual control mode, the method can further comprise directing the flight device into a remote control mode under which the flight device is controlled by the remote controller when no control data is received from the target device in a specified period of time.

In some embodiments, receiving the control data sent from the target device can comprise receiving the control data sent from the target device in a specified protocol format.

In another aspect, embodiments of the disclosure further provide a method of controlling a flight device comprising: generating a control request for requesting a control of the flight device; sending the control request to a controller of the flight device; and sending control data to the controller once determining that the controller responds to the control request, to direct the controller to convert the control data into an executable instruction for controlling the flight device and to execute the executable instruction.

In some embodiments, generating the control request can comprise generating, by a mobile terminal, the control request once detecting that a connection is established between the mobile terminal and the controller.

In some embodiments, generating, by the mobile terminal, the control request once detecting that a connection is established between the mobile terminal and the controller can comprise generating, by the mobile terminal, the control request once detecting that a connection is established between the mobile terminal and a wireless image transmission module, the wireless image transmission module being connected with the mobile terminal via a USB bus. Sending the control request to the controller of the flight device can comprise sending the control request to the controller of the flight device via the wireless image transmission module. Sending the control data to the controller can comprise sending the control data to the controller via the wireless image transmission module.

In some embodiments, before sending the control data to the controller, the method can further comprise generating the control data based upon an input operation of a user.

In some embodiments, generating the control request can comprise generating, by an onboard device of the flight device, the control request once a connection between the onboard device and the controller is established.

In some embodiments, sending the control request to the controller of the flight device can comprise sending the control request to the flight device via a serial interface connected with the controller.

In some embodiments, the onboard device can be a processor or a sensor connected with the flight device via a universal interface of the flight device, the universal interface of the flight device being configured to connect various types of the onboard devices.

In some embodiments, the control data sent to the controller can be control data in a specified protocol format.

In another aspect, embodiments of the disclosure further provide an apparatus for controlling a flight device comprising: a request receiving unit configured to receive a control request for requesting a control of the flight device from a target device; a data receiving unit configured to receive control data sent from the target device; and a data converting unit configured to convert the control data into an executable instruction for controlling the flight device.

In some embodiments, the request receiving unit can comprise a first request receiving unit configured to enable a controller of the flight device to receive the control request sent from a mobile terminal via a wireless image transmission module, the mobile terminal being connected with the wireless image transmission module via a USB bus. The data receiving unit can comprise a first data receiving unit configured to receive the control data sent from the mobile terminal via the wireless image transmission module.

In some embodiments, the apparatus can further comprise a link establishment unit configured to establish a communication link between the controller and the mobile terminal via the wireless image transmission module before the first request receiving unit receives the control request. The first request receiving unit can comprise a first request receiving subunit configured to receive the control request sent from the mobile terminal via the communication link. The first data receiving unit can comprise a first data receiving subunit configured to receive the control data sent from the mobile terminal via the communication link.

In some embodiments, the request receiving unit can comprise a second request receiving unit configured to receive the control request sent from an onboard device of the flight device. The data receiving unit can comprise a second data receiving unit configured to receive the control data sent from the onboard device.

In some embodiments, the second request receiving unit can comprise a second request receiving subunit configured to receive the control request sent from the onboard device of the flight device via a serial interface, the onboard device being connected with the controller via the serial interface. The second data receiving unit can comprise a second data receiving subunit configured to receive the control data sent from the onboard device via the serial interface.

In some embodiments, the onboard device can be a processor or a sensor connected with the flight device via a universal interface of the flight device, the universal interface of the flight device being configured to connect various types of the onboard devices.

In some embodiments, the data converting unit can comprise a data converting subunit configured to convert the control data into a control instruction of a remote controller of the flight device.

In some embodiments, the data converting subunit can comprise an instruction mapping unit configured to determine the control instruction corresponding to the control data based upon a preset mapping between the control data and the instruction of the remote controller.

In some embodiments, the apparatus can further comprise a mode control unit configured to direct the flight device into a virtual control mode in response to the control request received by the request receiving unit. The data receiving unit can be further configured to receive the control data sent from the target device in the virtual control mode.

In some embodiments, the mode control unit can comprise a program running subunit configured to call and run a preset virtual control program in response to the control request to enter the flight device into the virtual control mode. The data converting unit can comprise a program executing subunit configured to execute the virtual control program upon receiving the control data via a preset interface to convert the control data into the control instruction of the remote controller, the preset interface being a callable interface provided by the virtual control program.

In some embodiments, the apparatus can further comprise a mode detecting unit configured to, before the mode control unit directs the flight device into the virtual control mode, detecting whether the flight device is currently in the virtual control mode. The mode control unit can comprise a mode control subunit configured to direct the flight device into the virtual control mode if the mode detecting unit determines that the flight device is currently not in the virtual control mode.

In some embodiments, the apparatus can further comprise a mode termination unit configured to switch a control mode of the flight device to a remote control mode under which the flight device is controlled by the remote controller when a virtual control termination request is received from the target device.

In some embodiments, the apparatus can further comprise a mode switching unit configured to, after the mode control unit directs the flight device into the virtual control mode, direct the flight device into a remote control mode under which the flight device is controlled by the remote controller if no control data is received from the target device in a specified period of time.

In some embodiments, the control data received by the data receiving unit can be control data in a specified protocol format.

In another aspect, embodiments of the disclosure further provide an apparatus for controlling a flight device comprising: a request generating unit configured to generate a control request for requesting a control of the flight device; a request sending unit configured to send the control request to a controller of the flight device; and control data sending unit configured to send control data to the controller once determining that the controller responds to the control request, to direct the controller to convert the control data into an executable instruction for controlling the flight device and to execute the executable instruction.

In some embodiments, the request generating unit can comprise a first request subunit configured to generate the control request once detecting that a connection is established between a mobile terminal and the controller.

In some embodiments, the first request subunit can be further configured to generate the control request once detecting that a connection is established between the mobile terminal and a wireless image transmission module, the wireless image transmission module being connected with the mobile terminal via a USB bus. The request sending unit can comprise a first request sending subunit configured to send the control request to the controller of the flight device via the wireless image transmission module. The control data sending unit can comprise a first data sending subunit configured to send the control data to the controller via the wireless image transmission module.

In some embodiments, the apparatus can further comprise control data generating unit configured to generate the control data based upon an input operation of a user before the control data sending unit sends the control data to the controller.

In some embodiments, the request generating unit can comprise a second request generating subunit configured to generate the control request once a connection is established between an onboard device of the flight device and the controller.

In some embodiments, the request sending unit can comprise a second request sending subunit configured to send the control request to the flight device via a serial interface connected with the controller.

In some embodiments, the onboard device can be a processor or a sensor connected with the flight device via a universal interface of the flight device, the universal interface of the flight device being configured to connect various types of the onboard devices.

In some embodiments, the control data sent from the control data sending unit can be control data in a specified protocol format.

In another aspect, embodiments of the disclosure further provide a system for controlling a flight device comprising a controller and a remote controller of the flight device, and a target device for controlling the flight device. The target device can be configured to send a control request for requesting a control of the flight device to the controller, and send control data to the controller once the controller responds to the control request. The controller can be configured to, upon receiving the control data sent from the target device, convert the control data into an executable instruction for controlling the flight device in response to the control request.

In some embodiments, the target device can comprise a mobile terminal connected with the controller via a wireless image transmission module or an onboard device connected with the controller via a serial interface.

In another aspect, embodiments of the disclosure further provide a flight device comprising a controller and a storage medium. The controller can be configured to (1) receive a control request for requesting a control of the flight device from a target device, (2) receive control data sent from the target device, and (3) convert the control data into an executable instruction for controlling the flight device. The storage medium can be configured to store a program data for running the controller.

It can be seen from the above disclosed technical solutions, once the controller of the flight device receives a control request from the target device, if the controller receives the control data of the target device, the controller can convert the control data into an executable instruction for controlling the flight device to execute corresponding control operations. Therefore, the flight device can be controlled by a device other than the remote controller, thereby improving a flexibility in manipulating the unmanned aerial vehicle.

BRIEF DESCRIPTION OF THE DRAWINGS

Drawings of embodiments of the disclosure will be described for better understanding of the embodiments of the disclosure. It will be apparent that, the drawings merely illustrate exemplary embodiments of the disclosure. Those skilled in the art can conceive other drawings from the motivation of the illustrated drawings without inventive efforts.

DETAILED DESCRIPTION OF THE DISCLOSURE

Embodiments of the disclosure provide a method and an apparatus of controlling a flight device to improve a flexibility in controlling an unmanned aerial vehicle.

A better understanding of the disclosure will be obtained by reference to the following detailed description that sets forth illustrative embodiments with reference to the drawings. It will be apparent that, the embodiments described herein are merely provided by way of example only. Those skilled in the art can conceive various embodiments in light of those embodiments disclosed herein without inventive efforts, and all these embodiments are within the scope of the disclosure.

First, a method of controlling a flight device in accordance with the disclosure will be described.

Figure 1:
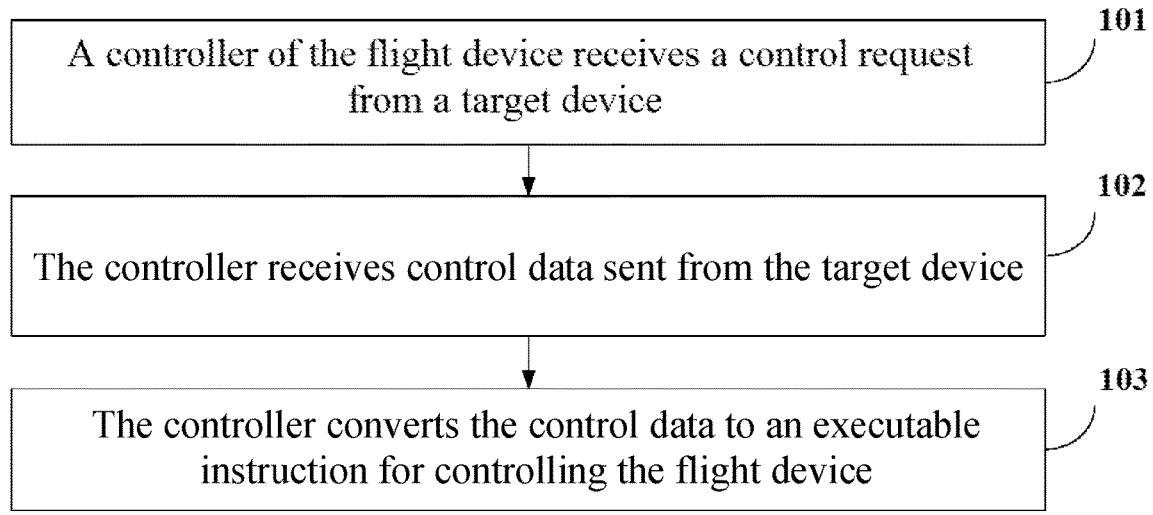
FIG. 1 shows a flowchart of an embodiment of a method of controlling a flight device in accordance with the disclosure.

FIG. 1 shows a flowchart of an embodiment of a method of controlling a flight device in accordance with the disclosure. The method in accordance with embodiments of the disclosure can comprise steps 101-103.

In step 101, a controller of the flight device can receive a control request from a target device.

In some embodiments, the control request can be used to request a control of the flight device.

In step 102, control data sent from the target device can be received.

In step 103, the control data can be converted into an executable instruction for controlling the flight device.

In some embodiments, the target device can be a mobile terminal (for example, a mobile phone or a remote controller) for controlling the flight device. Alternatively, the target device can be an onboard device carried on the flight device. An application of controlling the flight device can be preset to the target device. The target device can control the flight device by running the application.

In some instances, the control data can be sent from the target device to the flight device, and the controller of the flight device can convert the control data into an executable instruction for controlling the flight device, such that a flight control of the flight device or a control of an apparatus onboard the flight device can be effected by executing the executable instruction. In other words, the controller can be configured to convert the control data sent from various devices into an instruction that can be directly executed by the flight device, such that the flight device can be controlled by different types of devices. For instance, the control data sent from a device (for example, a mobile phone, or a remote controller for controlling other flight devices) can be converted into the executable instruction, such that the flight device can be controlled by the device such as a mobile phone or a remote controller for controlling other flight devices.

Various operations of the flight device can be controlled by the target device. The control data can include one type of control data or multiple types of control data. Accordingly, the control instruction converted from the control data can include multiple types of instructions for directing various operations. For instance, the control data can include control data for controlling a flight state of the flight device and control data for controlling an image capturing of the flight device.

In some embodiments, if the controller of the flight device receives the control data from the target device after receiving the control request, the controller can convert the control data into the executable instruction for controlling the flight device, such that a corresponding control operation can be effected by executing the executable instruction. In this way, the flight device can be controlled by a target device other than the remote controller, thereby improving a flexibility in manipulating the unmanned aerial vehicle.

It will be appreciated that, a conversion of the control data into the executable instruction for controlling the flight device can be implemented in various ways. For instance, a correspondence between various control data and executable instructions can be preset, such that an executable instruction corresponding to a received control data can be determined based upon the correspondence.

Optionally, the process of converting the control data into the executable instruction can include converting the control data into a control instruction of the remote controller of the flight device. The control instruction of the remote controller of the flight device can be a control instruction generated by operating a control stick of the remote controller by a user. The control instruction sent from the remote controller of the flight device can be identified and executed by the controller of the flight device. Therefore, once the control data being converted into the control instruction of the remote controller, the controller can directly execute the control instruction and effect a corresponding operation. An execution of the converted control instruction can be substantially similar to an execution of the control instruction sent from the remote controller, thus a detailed description thereof will be omitted for conciseness.

It will be apparent that, a conversion of the control data into the control instruction of the remote controller can be implemented in various ways by the controller.

In some embodiments, a mapping between the control data and the instructions of the remote controller can be preset to the controller. Therefore, once a control instruction is received from the target device, the control instruction of the remote controller corresponding to the received control data can be determined based upon the mapping.

Alternatively, a control instruction of the remote controller can be generated by the target device based upon an operation of the user, and control data comprising the control instruction can be generated. Upon receiving the control data, the controller can directly parse the control data and extract a control instruction of the remote controller from the control data.

It will be appreciated that, in practical applications, various other implementations are possible to convert the control data into the control instruction of the remote controller.

In some embodiments, the control method in accordance with the disclosure can comprise upon receiving the control request, directing the flight device into a virtual control mode in response to the control request.

In addition to the operation mode of existing flight devices in which the flight device is controlled by a remote controller, in some embodiments of the disclosure, the flight device can have an operation mode which is a virtual control mode. In the virtual control mode, a user can control the flight device using a device other than the remote controller of the flight device.

In some embodiments, a virtual control program can be preset to the controller. Upon calling and running the virtual control program, the controller can enter the virtual control mode, such that the control data can be processed by the virtual control program to obtain and execute the control instruction of the remote controller.

For instance, upon receiving the control request from the target device, the controller can call and run the virtual control program in response to the control request. The virtual control program can be executed to convert the control data into the control instruction of the remote controller if the control data sent from the target device is received via a preset interface. In some instances, the preset interface can be a callable interface provided by the virtual control program.

It will be appreciated that, the flight device can be already in the virtual control mode at the time the controller receives the control request from the target device. For example, the preset virtual control program can be already executed. In some instances, a determination on whether the flight device is in the virtual control mode can be made before directing the flight device into the virtual control mode. The flight device can be directed to enter the virtual control mode if the flight device is currently not in the virtual control mode; otherwise, the current virtual control mode can be maintained.

Once the flight device is in the virtual control mode, the target device can continuously send control data to the flight device to ensure a normal flight of the flight device including a flight or an operation of the flight device.

If no control data is received from the target device for a prolonged period of time, the flight device can be in an uncontrolled flight state or an abnormal flight state. Therefore, if no control data is received from the target device in a specified period of time under the virtual control mode, the flight device can be directed to enter into a remote control mode under which the flight device is controlled by the remote controller. Once the flight device is in the remote control mode, the user can control the flight device using the remote controller of the flight device.

It will be appreciated that, in any of the embodiments as described hereinabove, the target device can send a virtual control termination request to the controller of the flight device if the target device wishes to terminate a control of the flight device. Once receiving the virtual control termination request, the controller can switch the control mode of the flight device from the virtual control mode to the remote control mode under which the flight device is controlled by the remote controller.

It will be appreciated that, in the embodiments as described hereinabove, the control data sent from the target device can be data in a specified protocol format to enable the controller to distinguish between a data of the control instruction sent from the remote controller and the control data sent from the target device.

It will be appreciated that, in the embodiments as described hereinabove, various kinds of target devices can be used. For instance, the target device can be a mobile terminal or a device onboard the flight device. In some instances, the target device can be a device specified in advance, such as a device having established a correlation with the flight device in advance. For example, a mobile terminal can be the target terminal if an information of the mobile terminal is pre-stored in the flight device.

The data processing in controller receiving the control request and the control data can vary in view of different target devices. For instance, in case the target device is a mobile terminal, the mobile terminal can establish a connection with the controller via a wireless image transmission module and send the control data to the controller. Accordingly, the controller can receive the control request sent from the mobile terminal via the wireless image transmission module, and receive the control data sent from the mobile terminal via the wireless image transmission module in response to the control request.

For instance, in case the target device is an onboard device, the controller can directly receive the control request sent from the onboard device and receive the control data sent from the onboard device upon receiving the control request.

For a better understanding of the embodiments of the disclosure, exemplary embodiments will be provided in which the target device is a mobile terminal or an onboard device carried by the flight device.

An exemplary embodiment will be provided in which the target device is a mobile device.

Figure 2:
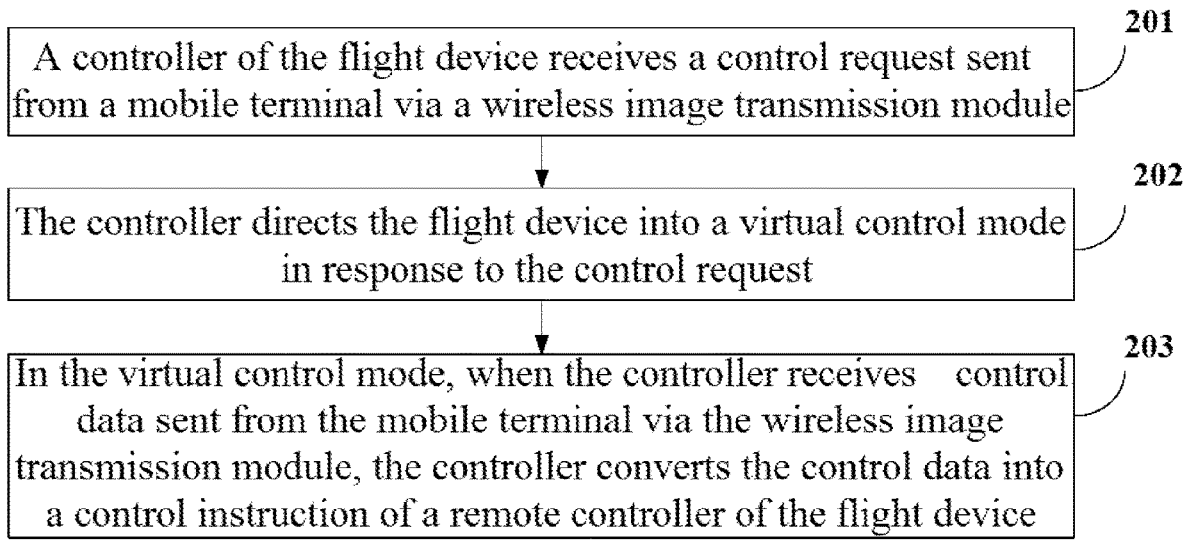
FIG. 2 shows a flowchart of another embodiment of a method of controlling a flight device in accordance with the disclosure.

FIG. 2 shows a flowchart of another embodiment of a method of controlling a flight device in accordance with the disclosure, in which the target device is a mobile device. The method in accordance with embodiments of the disclosure can comprise steps 201-203.

In step 201, a controller of the flight device can receive a control request sent from a mobile terminal via a wireless image transmission module.

In some embodiments, the control request can be used to request a control the flight device.

The mobile terminal can be connected with the wireless image transmission module via a Universal Serial Bus (USB).

It will be appreciated that, the mobile terminal can communicate directly with the controller of the flight device. Optionally, the mobile terminal can establish a wireless connection with the flight device via the wireless image transmission module. If the mobile terminal communicates with the flight device via the wireless image transmission module, the mobile terminal can be connected with the wireless image transmission module via a USB bus, such that the mobile terminal can send data to the controller of the flight device via the wireless image transmission module.

In some instances, the wireless image transmission module can be an independent apparatus. Optionally, the wireless image transmission module can be a wireless image transmission module provided within the remote controller of the flight device. A waste of hardware resource in providing an independent wireless image transmission module can be avoided by employing the wireless image transmission module of the remote controller.

In step 202, the controller can direct the flight device into a virtual control mode in response to the control request.

In step 203, under the virtual control mode, the controller can convert the control data into a control instruction of a remote controller of the flight device if the controller receives control data sent from the mobile terminal via the wireless image transmission module.

Accordingly, the controller can receive the control data from the mobile terminal via the wireless image transmission module.

It will be appreciated that, the control data can be data in a specified protocol format to enable the controller to identify the control data sent from the mobile terminal.

In some embodiments, the flight device can be controlled using the mobile terminal. A flexibility in operating the flight device can be improved by using the mobile terminals as the mobile terminals are flexible and convenient in sense of operation and mobility, In some embodiments, the controller of the flight device can establish a communication link between the controller and the mobile terminal via the wireless image transmission module before receiving the control request sent from the mobile terminal via the wireless image transmission module. For example, the mobile terminal can send a communication link establishment request to the controller of the flight device via the wireless image transmission module after the mobile terminal is connected with the wireless image transmission module. The controller of the flight device can establish a communication link with the mobile terminal via the wireless image transmission module in response to the communication link establishment request. In this way, the controller can receive the control request and the control data sent from the mobile terminal via the communication link.

It will be appreciated that, a description of those steps of the embodiment which are substantially similar to the above discussed embodiments is omitted for conciseness, and any description of those steps can be clear by referring to the description provided in any of the embodiments as discussed hereinabove. For example, the controller can convert the control data sent from the mobile terminal into a control instruction of the remote controller of the flight device by determining the control instruction of the remote controller corresponding to the control data based upon a preset mapping between the control data and the control instruction.

It will be appreciated that, upon the controller receiving the control request sent from the mobile terminal, a determination on whether the flight device is in the virtual control mode can be made before directing the flight device into the virtual control mode. The flight device can be directed to enter the virtual control mode if the flight device is currently not in the virtual control mode; otherwise, the current virtual control mode can be maintained.

It will be appreciated that, if no control data is received from the mobile terminal in a specified period of time under the virtual control mode, the flight device can be directed to enter into a remote control mode under which the flight device is controlled by the remote controller. In the remote control mode, the flight device can be controlled by the remote controller while a control from the mobile terminal on the flight device can be suppressed or eliminated.

A method of controlling a flight device in accordance with the disclosure will be provided in which the target device is a device onboard the flight device.

Figure 3:
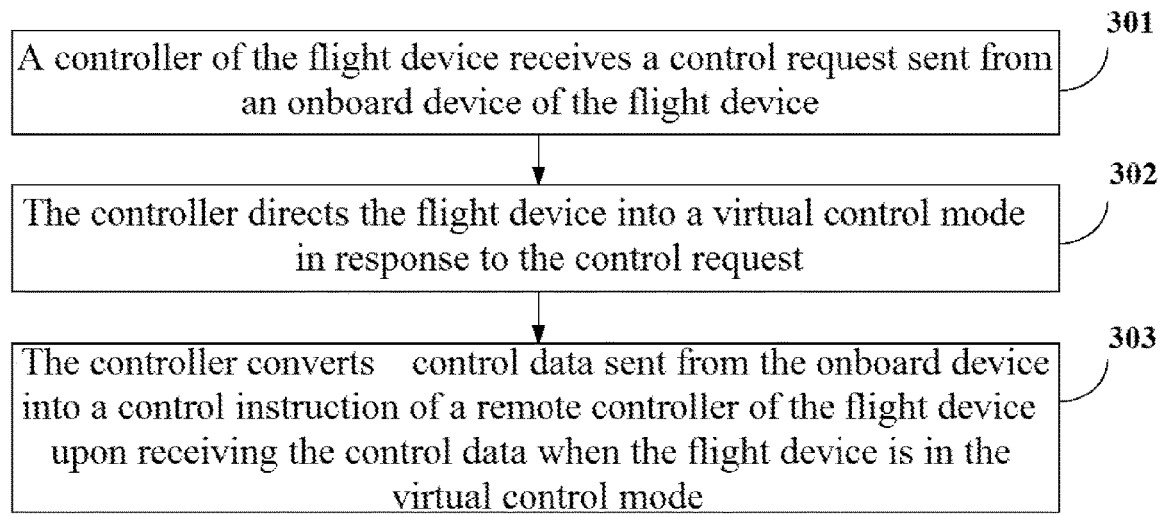
FIG. 3 shows a flowchart of another embodiment of a method of controlling a flight device in accordance with the disclosure.

FIG. 3 shows a flowchart of an embodiment of a method of controlling another flight device in accordance with the disclosure. In some embodiments, the target device can be an onboard device carried by the flight device. The method in accordance with embodiments of the disclosure can comprise steps 301-303.

In step 301, a controller of the flight device can receive a control request sent from an onboard device of the flight device.

In some embodiments, various types of onboard devices can be provided. For example, the onboard device can be a processor or a sensor.

In some instances, the onboard device can be connected to the controller of the flight device via a serial interface, in which case the controller can receive a control request sent from the onboard device of the flight device via the serial interface.

In step 302, the controller can direct the flight device into a virtual control mode in response to the control request.

Once directing the flight device into the virtual control mode, the controller of the flight device can control the flight device based upon control data sent from the onboard device.

A detailed description on directing the flight device into the virtual control mode can be clear by referring to the above described embodiments, and thus is omitted here for conciseness.

In step 303, under the virtual control mode, the controller can convert the control data into a control instruction of a remote controller of the flight device if the controller receives the control data sent from the onboard device.

A detailed description on converting the control data sent from the onboard device into the control instruction of the remote controller can be clear by referring to the above described embodiments, and thus is omitted here for conciseness.

In some instances, a control program can be preset to the onboard device for controlling the flight device when the flight device is in the virtual control mode.

Optionally, similar to the process in which the controller receives the control request sent from the onboard device via the serial interface, once directing the flight device into the virtual control mode, the controller can receive the control data sent from the onboard device via the serial interface.

It will be appreciated that, the control data sent from the onboard device can be data in a specified protocol format to enable the controller to identify that the data sent from the mobile terminal is the control data for the flight device.

In some embodiments, the onboard device can send a control request to the controller of the flight device, requesting a control of the flight device. The controller can direct the flight device to enter into the virtual control mode as a response to the control request. Upon receiving the control data sent from the onboard device, the controller can convert the control data into a control instruction which corresponds to an instruction generated by operating a stick of the remote controller of the flight device, such that an executable control instruction can be obtained and executed, and a control of the flight device using the onboard device can be effected. A flexibility in controlling the flight device can be improved by enabling the onboard device to control the flight device in addition to the remote controller.

It will be appreciated that, upon the controller receiving the control request sent from the onboard device, a determination on whether the flight device is in the virtual control mode can be made before directing the flight device into the virtual control mode. The flight device can be directed to enter the virtual control mode if the flight device is currently not in the virtual control mode; otherwise, the current virtual control mode can be maintained.

It will be appreciated that, if no control data is received from the onboard device in a specified period of time under the virtual control mode, the flight device can be directed by the controller to enter into a remote control mode under which the flight device is controlled by the remote controller. Under the remote control mode, the flight device is controlled by the remote controller instead of the onboard device. For example, under the remote control mode, the controller may not process the control data sent from the mobile terminal.

In some instances, the onboard device as provided in the above discussed embodiments of the disclosure can be a processor or a sensor connected with the flight device via a universal interface of the flight device. The universal interface of the flight device can be configured to connect various types of onboard devices.

In another aspect of the disclosure, embodiments of the disclosure provide a method of controlling a flight device.

Figure 4:
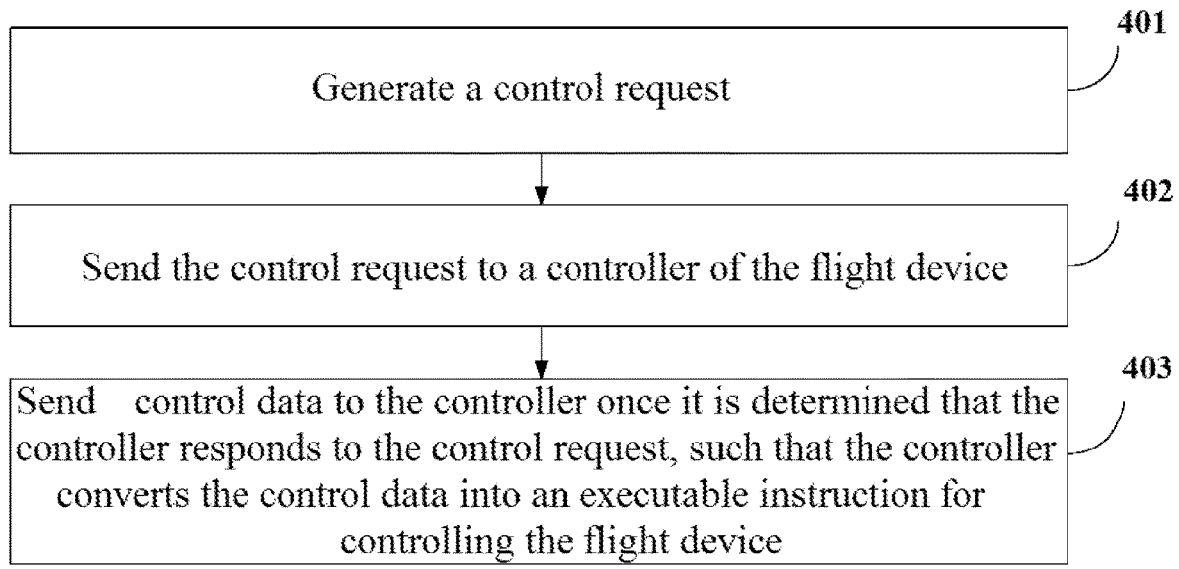
FIG. 4 shows a flowchart of an embodiment of a method of controlling a flight device in accordance with the disclosure.

FIG. 4 shows a flowchart of an embodiment of a method of controlling a flight device in accordance with the disclosure. The method in accordance with embodiments of the disclosure can comprise steps 401-403.

In step 401, a control request can be generated.

In some instances, the control request can be configured to request a control of the flight device.

In some embodiments of the disclosure, a target device for controlling the flight device can be different from a remote controller of the flight device. The target device can be a mobile terminal or an onboard device.

In step 402, the control request can be sent to a controller of the flight device.

In step 403, control data can be sent to the controller once it is determined that the controller responds to the control request, such that the controller can convert the control data into an executable instruction for controlling the flight device.

The controller can send a response back to the mobile terminal after responding to the control request, such that mobile terminal can be informed that the flight device is in a virtual control mode.

In some embodiments of the disclosure, the target device can send a control request to the controller, and control data can be sent to the controller if the controller responds to the control request. The controller can convert the control data into an executable instruction for controlling the flight device, such that corresponding control operations can be effected by executing the executable instruction. In this way, the flight device can be controlled by a target device other than the remote controller, thereby improving a flexibility in manipulating the unmanned aerial vehicle.

In some instances, the process of converting the control data into an executable instruction for controlling the flight device can comprise converting the control data into a control instruction of the remote controller of the flight device. A description of the process of converting the control data into a control instruction can be clear by referring the description provided in the embodiments of the method of controlling a flight device as discussed hereinabove, and this is omitted for conciseness.

Figure 5:
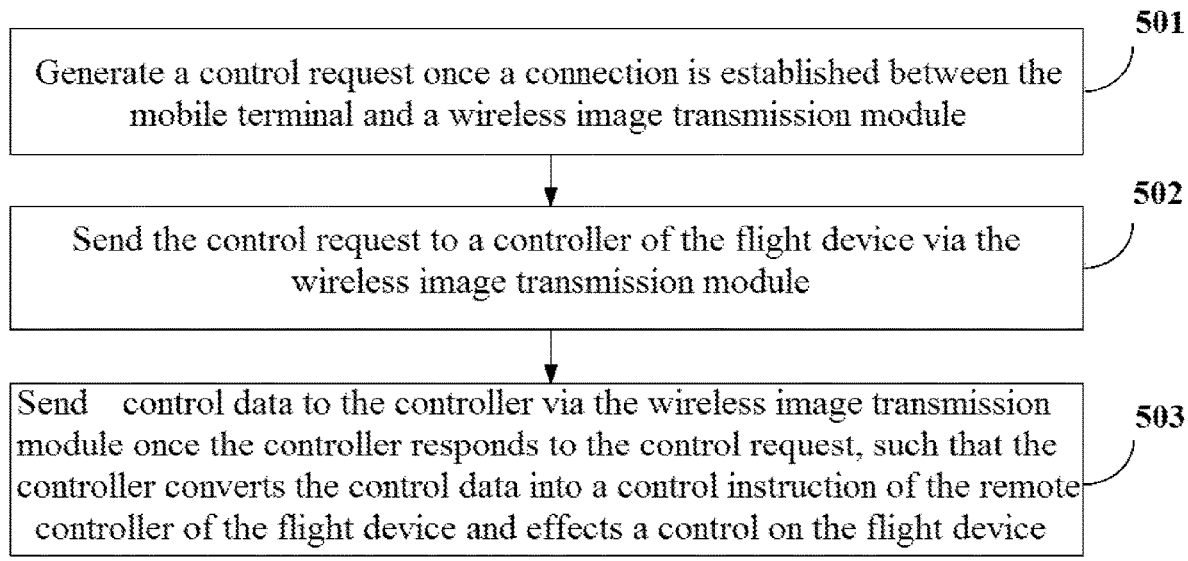
FIG. 5 shows a flowchart of another embodiment of a method of controlling a flight device in accordance with the disclosure.

An embodiment in which the target device is a mobile terminal will be provided. FIG. 5 shows a flowchart of another embodiment of a method of controlling a flight device in accordance with the disclosure. The method in accordance with embodiments of the disclosure can comprise steps 501-503.

In step 501, a control request can be generated once a connection is established between the mobile terminal and a wireless image transmission module.

In some embodiments of the disclosure, the mobile terminal can be a mobile phone, a palmtop or a tablet computer.

In some instances, the control request can be configured to request a control of the flight device.

The wireless image transmission module can be connected with the mobile terminal via a USB bus. Optionally, the wireless image transmission module can be a wireless image transmission module provided in a remote controller of the flight device to lower a hardware resource consumption.

In step 502, the control request can be sent to a controller of the flight device via the wireless image transmission module.

In some instances, a communication link can be established between the mobile terminal and the controller of the flight device via the wireless image transmission module before the mobile terminal sending the control request, such that the control request can be sent to the controller over the communication link.

In step 503, control data can be sent to the controller over the wireless image transmission module once it is determined that the controller responds to the control request, such that the controller can convert the control data into a control instruction of the remote controller of the flight device and a control for the flight device can be effected.

In some embodiments, the controller can control the flight device to enter into a virtual control mode after responding to the control request. In some instances, the controller can send a response back to the mobile terminal after responding to the control request, such that the mobile terminal can be informed that the flight device is in the virtual control mode.

In some embodiments of the disclosure, the mobile terminal can send a control request to the controller of the flight device via the wireless image transmission module, and control data for the flight device can be sent to the controller if the controller responds to the control request. The controller can convert the control data into a control instruction of the remote controller, such that a control of the flight device can be effected. In this way, the flight device can be controlled by the mobile terminal, thereby improving a flexibility in manipulating the flight device.

In some instances, the mobile terminal can generate the control data based upon an input operation of a user.

It will be appreciated that, in practical applications, the mobile terminal can be provided with a virtual control program for controlling the flight device. Once it is detected that a connection is established between the mobile terminal and the wireless image transmission module, the virtual control program can be run by calling an interface provided by the virtual control program. The user can perform an input operation to generate the control data using the virtual control program.

In case that the target device is an onboard device, the process of generating the control request can comprise generating the control request by the onboard device of the flight device once a connection is established between the onboard device of the flight device and the controller.

In some instances, the process of sending the control request to the controller can comprise sending the control request to the flight device via a serial interface connected with the controller.

In some instances, similar to the embodiments of the method of controlling a flight device as discussed hereinabove, the onboard device can be a processor or a sensor that is connected with the flight device via a universal interface of the flight device. The universal interface of the flight device can be configured to connect various types of onboard devices.

It will be appreciated that, the control data sent from the mobile terminal or the onboard device to the controller can be data in a specified protocol format to enable the controller to identify that the data sent from the mobile terminal or the onboard device is data for controlling the flight device.

It will be appreciated that, the method of controlling the flight device can comprise operations performed on the target device side in controlling the flight device. Therefore, a description of the method of controlling a flight device is simplified for conciseness. An implementation of the method can be clear by referring to the description of the processes performed on the mobile terminal side and the onboard device side provided in the embodiments of the method of controlling the flight device, as discussed hereinabove.

Embodiments of the disclosure also provides an apparatus for controlling a flight device corresponding to the method of controlling the flight device.

Figure 6:
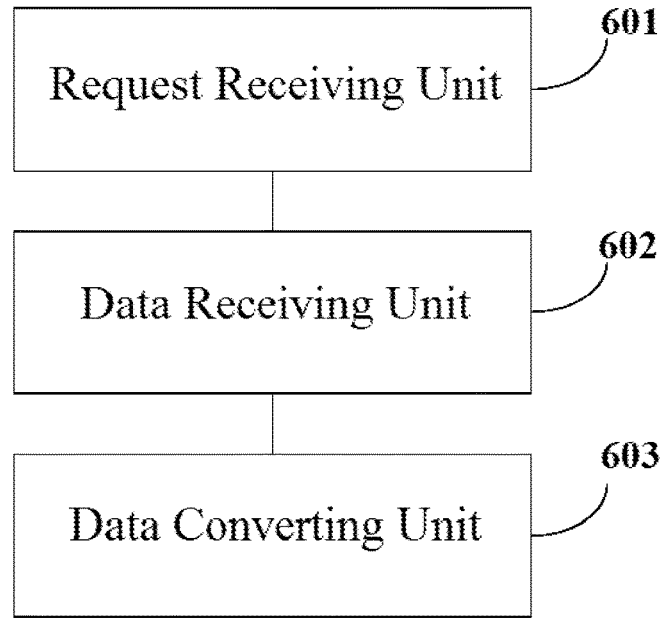
FIG. 6 shows a configuration of an embodiment of an apparatus for controlling a flight device in accordance with the disclosure.

FIG. 6 shows an embodiment of an apparatus for controlling a flight device in accordance with the disclosure. The apparatus in accordance with embodiments of the disclosure can comprise a request receiving unit 601 configured to receive a control request for requesting a control of the flight device from a target device; a data receiving unit 602 configured to receive control data sent from the target device; and a data converting unit 603 configured to convert the control data into an executable instruction for controlling the flight device.

In some embodiments, the request receiving unit can comprise a first request receiving unit configured to enable a controller of the flight device to receive the control request sent from a mobile terminal via a wireless image transmission module. In some instances, the mobile terminal can be connected with the wireless image transmission module via a USB bus. The data receiving unit can comprise a first data receiving unit configured to receive control data sent from the mobile terminal via the wireless image transmission module.

In an embodiment, the apparatus can further comprise: a link establishment unit configured to establish a communication link between the controller and the mobile terminal via the wireless image transmission module before the first request receiving unit receiving the control request. The first request receiving unit can comprise a first request receiving subunit configured to receive the control request sent from the mobile terminal over the communication link. The first data receiving unit can comprise a first data receiving subunit configured to receive the control data sent from the mobile terminal over the communication link.

In another embodiment, the request receiving unit can comprise a second request receiving unit configured to receive a control request sent from an onboard device of the flight device. The data receiving unit can comprise a second data receiving unit configured to receive the control data sent from the onboard device.

In some instances, the second request receiving unit can comprise a second request receiving subunit configured to receive the control request sent from the onboard device of the flight device via a serial interface. The onboard device can be connected with the controller via the serial interface. The second data receiving unit can comprise a second data receiving subunit configured to receive the control data sent from the onboard device via the serial interface.

In some instances, the onboard device can be a processor or a sensor connected with the flight device via a universal interface of the flight device. The universal interface of the flight device can be configured to connect various types of onboard devices.

In an embodiment, the data converting unit can comprise a data converting subunit configured to convert the control data into a control instruction of a remote controller of the flight device. In some instances, the data converting subunit can comprise an instruction mapping unit configured to determine the control instruction corresponding to the control data based upon a preset mapping between control data and instructions of the remote controller.

In some instances, the apparatus can comprise a mode control unit configured to direct the flight device into a virtual control mode in response to the control request received by the request receiving unit. In some instances, the data receiving unit can be configured to receive the control data sent from the target device in the virtual control mode. In some instances, the mode control unit can comprise a program running subunit configured to call and run a preset virtual control program in response to the control request to direct the flight device into the virtual control mode. In some instances, the data converting unit can comprise a program executing subunit configured to execute the virtual control program to convert the control data into a control instruction of the remote controller upon receiving the control data via a preset interface. In some instances, the preset interface can be a callable interface provided by the virtual control program.

In some embodiments, providing that the apparatus comprises a mode control unit, the apparatus can further comprise a mode detecting unit configured to detect whether the flight device is currently in the virtual control mode before the flight device is directed into the virtual control mode by the mode control unit. In some instances, the mode control unit can comprise a mode control subunit configured to direct the flight device into the virtual control mode if the mode detecting unit determines that the flight device is currently not in the virtual control mode.

In some embodiments, providing that the apparatus comprises a mode control unit, the apparatus can further comprise a mode termination unit configured to switch a control mode of the flight device to a remote control mode under which the flight device is controlled by the remote controller once a virtual control termination request is received from the target device.

In some embodiments, providing that the apparatus comprises a mode control unit, the apparatus can further comprise a mode switching unit configured to, after the mode control unit directs the flight device into the virtual control mode, direct the flight device into a remote control mode under which the flight device is controlled by the remote controller if no control data is received from the target device in a specified period of time.

In some embodiments, in any of the embodiments of the apparatus as discussed hereinabove, the control data received by the data receiving unit can be control data in a specified protocol format.

In another aspect, the disclosure provides an apparatus for controlling a flight device corresponding to a method of controlling a flight device of the disclosure.

Figure 7:
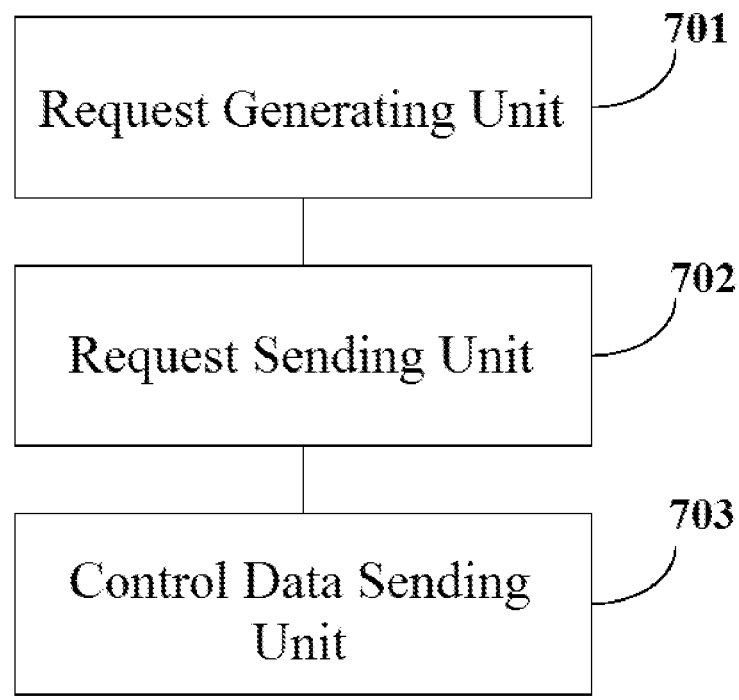
FIG. 7 shows a configuration of an embodiment of another apparatus for controlling a flight device in accordance with the disclosure.

FIG. 7 shows a configuration of an embodiment of another apparatus for controlling a flight device in accordance with the disclosure. The apparatus in accordance with embodiments of the disclosure can comprise a request generating unit 701 configured to generate a control request for requesting a control of the flight device; a request sending unit 702 configured to send the control request to a controller of the flight device; and control data sending unit 703 configured to send control data to the controller to enable the controller to convert the control data into an executable instruction for controlling the flight device and execute the executable instruction once determining that the controller responds to the control request.

In an embodiment, the request generating unit can comprise a first request generating subunit configured to generate a control request once a connection is established between a mobile terminal and the controller. In some instances, the first request generating subunit can be configured to generate a control request once a connection is established between the mobile terminal and a wireless image transmission module. In some instances, the wireless image transmission module can be connected with the mobile terminal via a USB bus. In some instances, the request sending unit can comprise a first request sending subunit configured to send the control request to the controller of the flight device via the wireless image transmission module. In some instances, the control data sending unit can comprise a first data sending subunit configured to send the control data to the controller via the wireless image transmission module.

In some embodiments, the apparatus can further comprise control data generating unit configured to generate control data based upon an input operation of a user before the control data sending unit sends the control data to the controller.

In another embodiments, the request generating unit can comprise a second request generating subunit configured to generate a control request once a connection is established between an onboard device of the flight device and the controller. In some instances, the request sending unit can comprise a second request sending subunit configured to send the control request to the flight device via a serial interface connected with the controller.

In some embodiments, the onboard device can be a processor or a sensor connected with the flight device via a universal interface of the flight device. The universal interface of the flight device can be configured to connect various types of onboard devices.

In some embodiments of the apparatus as discussed hereinabove, the control data sent from the control data sending unit can be control data in a specified protocol format.

Figure 8:
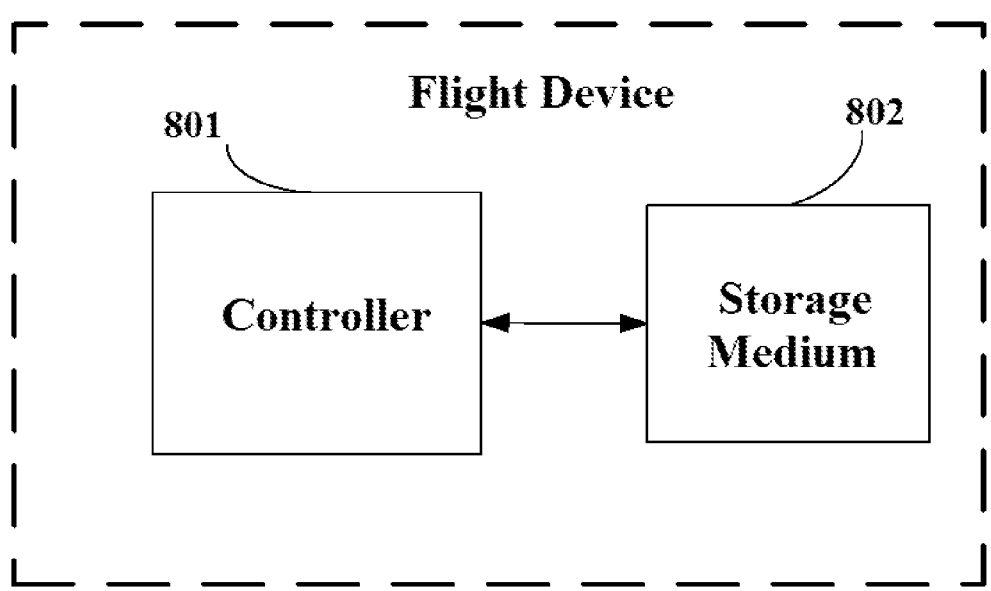
FIG. 8 shows a configuration of an embodiment of a flight device in accordance with the disclosure.

In another aspect, embodiments of the disclosure provide a flight device. FIG. 8 shows a configuration of an embodiment of a flight device in accordance with the disclosure. In some embodiments, the flight device can comprise a controller 801 and a storage medium 802.

In some embodiments, the controller 801 can be configured to (1) receive a control request for requesting a control of the flight device from a target device, (2) receive control data sent from the target device, and (3) convert the control data into an executable instruction for controlling the flight device. In some embodiments, the storage medium 802 can be configured to store a program data for running the controller.

It will be appreciated that, the flight device can comprise a sensor provided therein and an onboard device such as a sensor that is provided outside the flight device and connected with a universal interface of the flight device.

In another aspect, embodiments of the disclosure provide a system for controlling a flight device.

Figure 9:
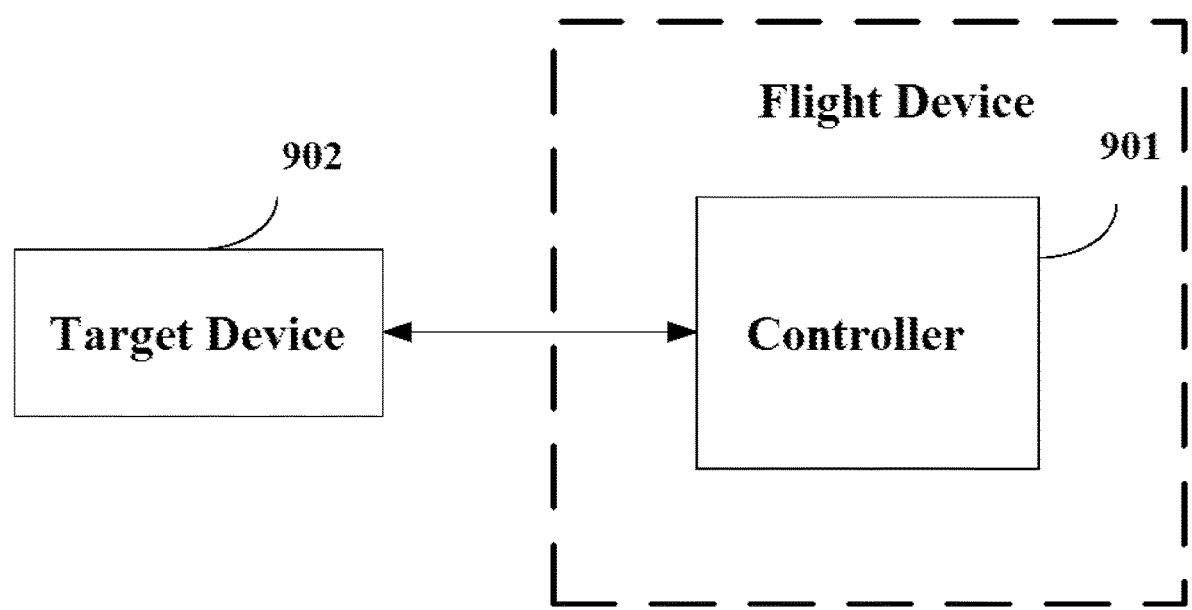
FIG. 9 shows a configuration of an embodiment of a system for controlling a flight device in accordance with the disclosure.

FIG. 9 shows a configuration of an embodiment of a system for controlling a flight device in accordance with the disclosure. The system in accordance with embodiments of the disclosure can comprise a controller 901 of the flight device and a target device 902 for controlling the flight device.

In some embodiments, the target device 902 can be configured to (1) send a control request for requesting a control of the flight device to the controller 901, and (2) send control data to the controller 901 once the controller 901 responds to the control request. The controller 901 can be configured to (1) respond to the control request, (2) convert the control data into an executable instruction for controlling the flight device upon receiving the control data sent from the target device 902, and (3) execute the executable instruction.

In some embodiments, the target device can comprise a mobile terminal connected with the controller via a wireless image transmission module or an onboard device connected with the controller via a serial interface.

Embodiments of the disclosure are described in a progressive manner. Each embodiment focuses on a difference over other embodiments. The same or similar aspects of the embodiments can be clear by referring to each other. The devices disclosed in the embodiments may correspond to the method as disclosed in the embodiments. Therefore, a detailed description of the devices may be omitted for conciseness. The devices can be clear to those skilled in the art by referring to the methods of the disclosure.

It will be apparent to those skilled in the art that, units and steps of the disclosed embodiments can be implemented by an electronic hardware, a computer software or a combination thereof. A function of the units and steps of disclosed embodiments is generally described in the disclosure to illustrate an interchangeability between a hardware and a software. A function can be implemented by either a hardware or a software, depending on the specific application and the designed constraint of a technical solution. A specific application can be implemented in various ways without departing from the scope of the disclosure.

Methods or algorithms described in embodiments of the disclosure can be implemented with a hardware, a software module executed by a processor, or a combination thereof. The software module can be stored in a random access memory (RAM), an internal memory, a read-only memory (ROM), an electrically-programmable ROM, an electrically-erasable programmable ROM, a register, a hard disk, a removable disk, a CD-ROM or a storage medium of any other forms known in the art.

Embodiments are disclosed to enable those skilled in the art to implement or use the disclosure. Various modifications to the embodiments can be apparent to those skilled in the art. The general principles as defined herein can be implemented in other embodiments without departing from the spirit or scope of the disclosure. The disclosure is not intended to be limited to the illustrated embodiments but can be interpreted as the widest scope consistent with the principles and novel features as disclosed.

What is claimed is:

1. A method of controlling a flight device, comprising:
   receiving, by a controller of the flight device, a control request from a target device for requesting a control of the flight device;
   receiving control data sent from the target device;
   converting the control data into an executable instruction for controlling the flight device;
   directing the flight device to operate in a virtual control mode; and
   in response to not receiving control data from the target device for a specified period of time, directing the flight device to operate in a remote control mode under which the flight device is controlled by a remote controller.

2. The method of claim 1, wherein:
   receiving, by the controller of the flight device, the control request from the target device includes receiving, by the controller of the flight device, the control request from a mobile terminal, and
   receiving the control data sent from the target device includes receiving the control data sent from the mobile terminal.

3. The method of claim 2, wherein:
receiving, by the controller of the flight device, the control request from the mobile terminal includes receiving, by the controller of the flight device, the control request sent from the mobile terminal via a wireless image transmission module, the mobile terminal being connected with the wireless image transmission module via a USB bus, and
receiving the control data sent from the mobile terminal includes receiving the control data sent from the mobile terminal via the wireless image transmission module.

4. The method of claim 1, wherein receiving, by the controller of the flight device, the control request from the target device includes receiving, by the controller of the flight device, the control request sent from a processor or a sensor connected with the flight device via a universal interface of the flight device, the universal interface of the flight device being configured to connect onboard devices of various types.

5. The method of claim 1, wherein converting the control data into the executable instruction for controlling the flight device includes converting the control data into a control instruction of a remote controller of the flight device.

6. The method of claim 5, wherein converting the control data into the control instruction of the remote controller of the flight device includes determining the control instruction corresponding to the control data based upon a preset mapping between control data and instructions of the remote controller.

7. The method of claim 1, further comprising, after receiving, by the controller, the control request:
directing the flight device to operate in the virtual control mode; and
in response to receiving a virtual control termination request from the target device, switching a control mode of the flight device to the remote control mode under which the flight device is controlled by the remote controller.

8. An apparatus for controlling a flight device, comprising:
a controller; and
a storage medium storing a program that, when executed by the controller, causes the controller to:
receive a control request from a target device for requesting a control of the flight device;
direct the flight device to operate in a virtual control mode in response to the control request;
receive control data sent from the target device in the virtual control mode;
convert the control data into an executable instruction for controlling the flight device; and
in response to receiving a virtual control termination request from the target device, switch a control mode of the flight device to a remote control mode under which the flight device is controlled by a remote controller.

9. The apparatus of claim 8, wherein the program further causes the controller to:
receive the control request from a mobile terminal; and
receive the control data sent from the mobile terminal.

10. The apparatus of claim 9, wherein the program further causes the controller to:
receive the control request sent from the mobile terminal via a wireless image transmission module, the mobile terminal being connected with the wireless image transmission module via a USB bus; and
receive the control data sent from the mobile terminal via the wireless image transmission module.

11. The apparatus of claim 10, wherein:
the program further causes the controller to, before receiving the control request sent from the mobile terminal via the wireless image transmission module:
establish a communication link between the controller and the mobile terminal via the wireless image transmission module;
the program further causes the controller to:
receive the control request sent from the mobile terminal via the communication link; and
receive the control data sent from the mobile terminal via the communication link.

12. The apparatus of claim 8, wherein the program further causes the controller to:
receive the control request sent from an onboard device of the flight device; and
receive the control data sent from the onboard device.

13. The apparatus of claim 12, wherein:
the onboard device includes a processor or a sensor connected with the flight device via a universal interface of the flight device, the universal interface of the flight device being configured to connect onboard devices of various types; and
the program further causes the controller to:
receive the control request sent from the processor or the sensor.

14. The apparatus of claim 8, wherein the program further causes the controller to:
convert the control data into a control instruction of the remote controller of the flight device.

15. The apparatus of claim 14, wherein the program further causes the controller to determine the control instruction corresponding to the control data based upon a preset mapping between control data and instructions of the remote controller.

16. The apparatus of claim 8, wherein the program further causes the controller to:
call and run a preset virtual control program in response to the control request to direct the flight device to operate in the virtual control mode; and
execute the virtual control program upon receiving the control data via a preset interface to convert the control data into the control instruction of the remote controller, the preset interface being a callable interface provided by the virtual control program.

17. The apparatus of claim 8, wherein the program further causes the controller to, after directing the flight device to operate in the virtual control mode:
in response to not receiving control data from the target device for a specified period of time, direct the flight device to operate in the remote control mode under which the flight device is controlled by the remote controller.

* * * * *